(12) United States Patent
Wang

(10) Patent No.: US 7,012,594 B2
(45) Date of Patent: Mar. 14, 2006

(54) RATCHET STRUCTURE FOR INPUT DEVICE

(75) Inventor: Wei-Chuan Wang, Tu-Cheng (TW)

(73) Assignee: KYE Systems Corp., (TW)

( * ) Notice: Subject to any disclaimer, the term of this patent is extended or adjusted under 35 U.S.C. 154(b) by 484 days.

(21) Appl. No.: 10/158,246

(22) Filed: May 30, 2002

(65) Prior Publication Data

US 2003/0222844 A1    Dec. 4, 2003

(51) Int. Cl.
 *G09G 5/08* (2006.01)
(52) U.S. Cl. ..................................... 345/163
(58) Field of Classification Search .............. 345/163, 345/166
See application file for complete search history.

(56) References Cited

U.S. PATENT DOCUMENTS

| | | | | |
|---|---|---|---|---|
| 5,808,568 A | * | 9/1998 | Wu | 341/20 |
| 5,912,611 A | | 6/1999 | Berggren et al. | |
| 5,912,661 A | * | 6/1999 | Siddiqui | 345/166 |
| 6,014,130 A | * | 1/2000 | Yung-Chou | 345/163 |
| 6,157,369 A | | 12/2000 | Merminod et al. | |
| 6,198,057 B1 | | 3/2001 | Sato et al. | |
| 6,285,355 B1 | * | 9/2001 | Chang | 345/163 |
| 6,326,949 B1 | * | 12/2001 | Merminod et al. | 345/163 |
| 6,340,966 B1 | * | 1/2002 | Wang et al. | 345/163 |
| 6,353,429 B1 | * | 3/2002 | Long | 345/158 |
| 6,400,284 B1 | * | 6/2002 | Wu | 341/20 |
| 6,400,356 B1 | * | 6/2002 | Bidiville et al. | 345/163 |
| 6,459,421 B1 | * | 10/2002 | Cho et al. | 345/166 |
| 6,522,321 B1 | * | 2/2003 | Chen et al. | 345/163 |
| 6,563,490 B1 | * | 5/2003 | Wang et al. | 345/165 |

* cited by examiner

*Primary Examiner*—Ryan Yang
(74) *Attorney, Agent, or Firm*—Raymond Sun

(57) ABSTRACT

A Z-axis device for an input device has a rotatable roller having a first side and a second side, the second side of the roller having a plurality of grooves. The Z-axis device also has a support mechanism that positions the roller for reciprocating pivoting movement, a first axle extending from the first side of the roller and supported by the support mechanism, and a second axle extending from the second side of the roller and supported by the support mechanism. The second axle has a resilient element coupled thereto, with the resilient element constantly engaging one of the grooves, and engaging different grooves as the roller is rotated.

15 Claims, 6 Drawing Sheets

RATCHET STRUCTURE FOR INPUT DEVICE

BACKGROUND OF THE INVENTION

1. Field of the Invention

The present invention relates to input devices, and in particular, to a ratchet structure for use in an input device such as a computer mouse.

2. Description of the Prior Art

The increased popularity of personal computers (PCs) also means that the accompanying input devices, such as computer mice, are widely used as well. Many computer mice are provided with a roller thereon for controlling the movement of a Z-axle on the display. This Z-axis control mechanism is often used for scrolling a screen and is especially useful in Internet applications. Examples include U.S. Pat. No. 6,198,057 for a rotary operating-type electronic device, U.S. Pat. No. 6,157,369 for an optical-mechanical roller with ratchet, U.S. Pat. No. 6,326,949 for a wheel support guide for vertical wheel support movement, and U.S. Pat. No. 5,912,611 for a Z-encoder mechanism.

The above-mentioned patents disclose complicated Z-axis devices positioned at the base of the input device for supporting a wheel or roller support mechanism. The roller can be pressed to activate a micro switch for controlling certain operations. Some of these Z-axis devices also provide a corresponding ratchet mechanism that provides a ratchet feedback effect while the roller is being turned by a user. The turning of the roller with a ratchet mechanism also allows for precise positioning at the desired location.

Although the above-mentioned patents describe Z-axis devices that can achieve the effect of precise control when turning the roller, a number of drawbacks still remain. For example, the Z-axis devices in U.S. Pat. Nos. 6,157,369 and 6,326,949 occupy smaller operating spaces, but each involves a complex structure that carries with it a higher cost to produce. The large variety of the components in each of these structures will result in a higher molding cost, and will also make them hard to assemble, especially when the manufacturing will require an increased number of operating procedures with small tolerances for error.

As another example, U.S. Pat. No. 5,912,611 discloses a Z-axis device that has a simple structure but the structure occupies a larger space, which goes against the modern trend of minimizing the sizes of all electronic products.

Thus, there still remains a need for a Z-axis device that has a simple structure which occupies minimal space and which is inexpensive to manufacture.

SUMMARY OF THE DISCLOSURE

It is an object of the present invention to provide a Z-axis device for an input device that has a simple construction.

It is another object of the present invention to provide a Z-axis device for an input device that occupies minimal space in the input device.

It is yet another object of the present invention to provide a Z-axis device for an input device that is inexpensive to manufacture.

In order to accomplish the objects of the present invention, the present invention provides a Z-axis device for an input device. The Z-axis device has a rotatable roller having a first side and a second side, the second side of the roller having a plurality of grooves. The Z-axis device also has a support mechanism that positions the roller for reciprocating pivoting movement, a first axle extending from the first side of the roller and supported by the support mechanism, and a second axle extending from the second side of the roller and supported by the support mechanism. The second axle has a resilient element coupled thereto, with the resilient element constantly engaging one of the grooves, and engaging different grooves as the roller is rotated.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
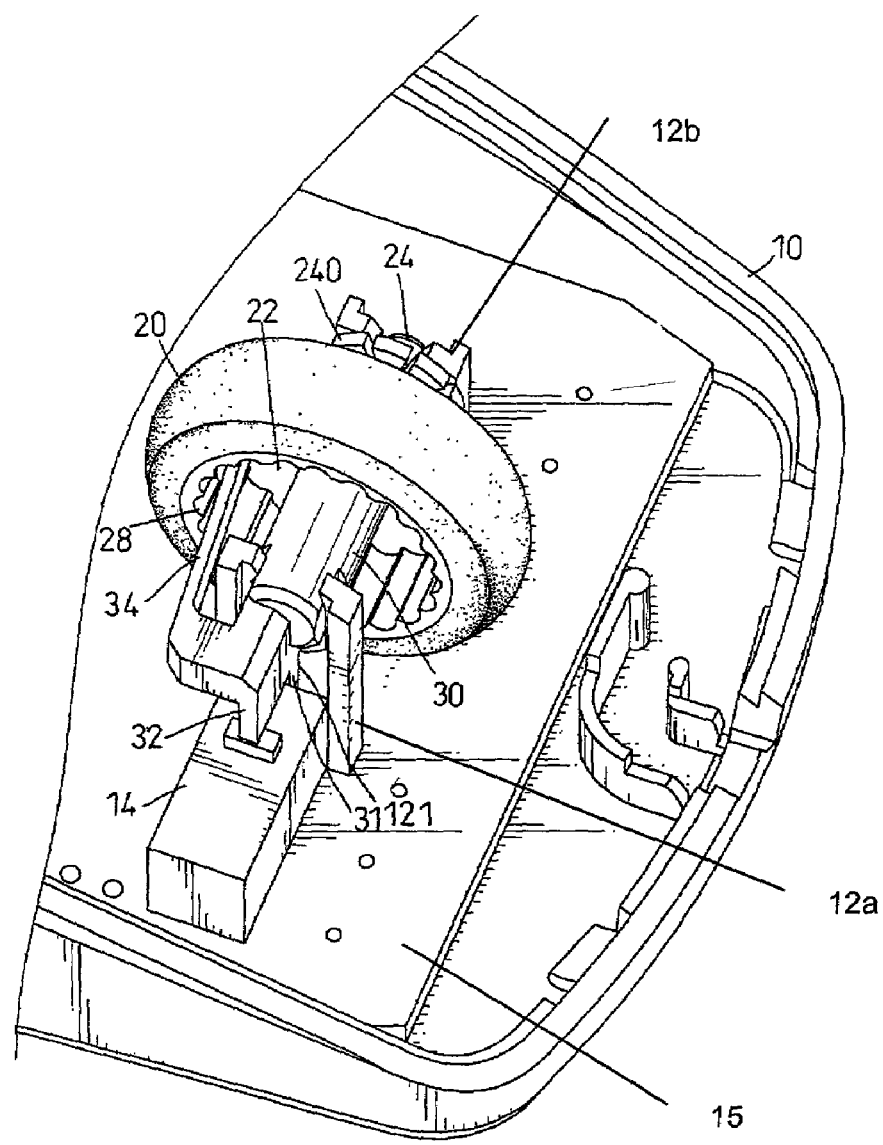
FIG. 1 is a perspective view of a Z-axis device within an input device according to one embodiment of the present invention.
Figure 2:
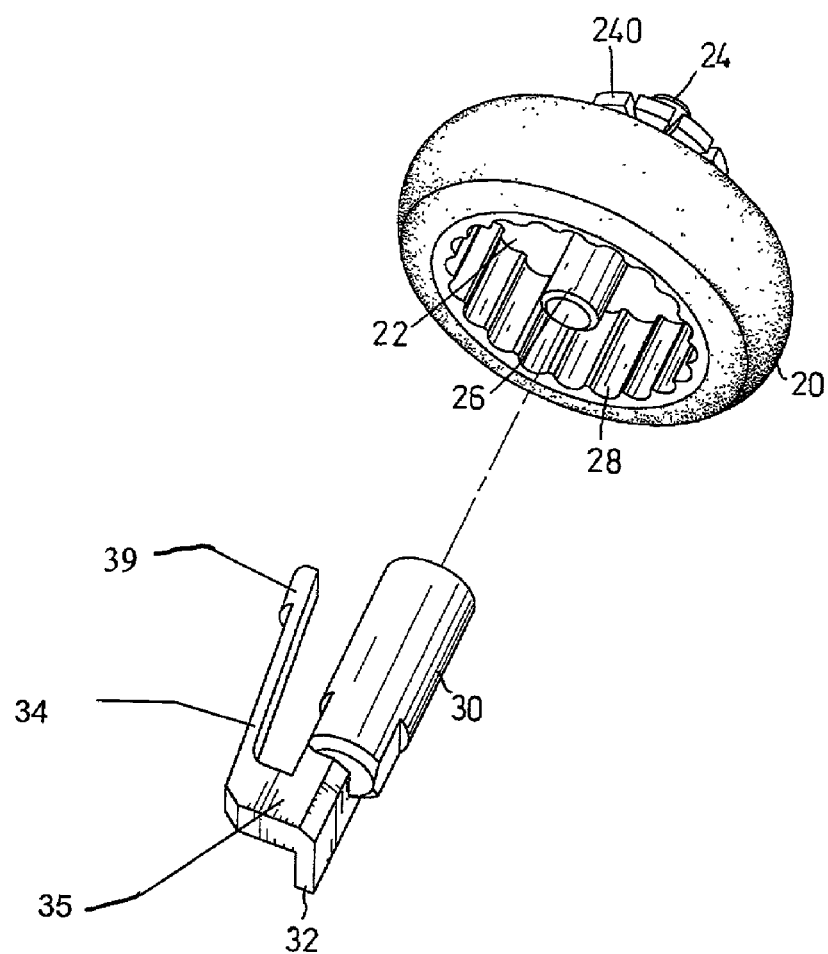
FIG. 2 is an exploded perspective view of the ratchet structure for the Z-axis device of FIG. 1.
Figure 3:
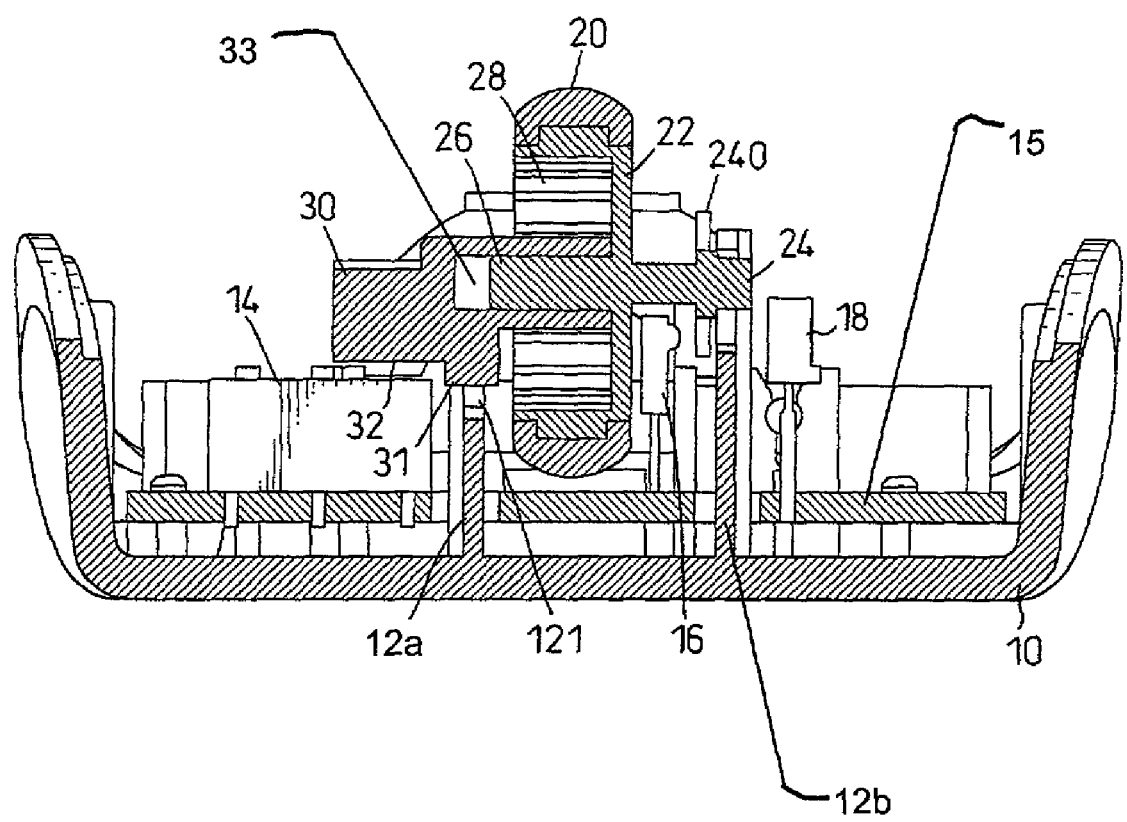
FIG. 3 is a cross-sectional view of the Z-axis device of FIG. 1.

FIGS. 1–3 illustrate one embodiment of a Z-axis device according to the present invention. The Z-axis device of the present invention is used in connection with an input device, such as a computer mouse. FIG. 1 illustrates a base 10 of an input device, such as a computer mouse, with a roller 20 provided on the base 10. A pair of supports 12a and 12b are fixed on the base 10. A micro-switch 14 is positioned on the printed circuit board (PCB) 15 on an external side of one of the supports 12a. The roller 20 is positioned between the supports 12a, 12b. The roller 20 is supported on the support 12a by an axle sheath 30, and on the other support 12b by an outer axle 24. The outer axle 24 extends from a first side of the rim 22 of the roller 20. The outer axle 24 has a grating 240 that defines a plurality of alternating cut-outs. The roller 20 has an inner axle 26 extending from a second side of the rim 22 of the roller 20. The roller 20 has grooves 28 provided around the inner periphery of the roller 20 on the second side of the rim 22. The inner axle 26 is inserted into an internal bore 33 of the axle sheath 30 to couple the axle sheath 30 to the roller 20. The axle sheath 30 is seated in a U-shaped groove 121 provided at the top of the support 12a adjacent to the micro switch 14, and is adapted to experience upward and downward pivoting movement within the groove 121 when the user presses on or releases the roller 20. The axle sheath 30 also has a protrusion 32 extending from its bottom that is adapted to activate the micro switch 14 when the protrusion 32 contacts the micro switch 14.

A base member 35 supports the axle sheath 30 and a resilient element 34 that is spaced apart from the axle sheath 30 and which extends generally parallel to the axle sheath 30. The resilient element 34 can be a flexible shaft that extends from the base member 35, and has an enlarged tip 39 that is adapted to constantly engage (i.e., be seated within) one of the grooves 28 such that the rotation of the roller 20 provides a ratchet tactile feedback to a user. The resilient element 34, the base member 35, and the axle sheath 30 can be provided together in one piece.

As shown in FIG. 3, the sheath 30 is sleeved onto the inner axle 26 and the roller 20 is positioned between the supports 12a, 12b, with the outer axle 24 pivoted on an upper groove in the support 12b and the axle sheath 30 pivoted on the support 12a inside the groove 121. A fixing element 31 extends from the bottom of the axle sheath 30 and lies in the groove 121. The fixing element 31 has a configuration (e.g., a square, rectangular or other configuration that has straight sides that will resist rotation) which functions to prevent the axle sheath 30 from rolling or rotating when the user rotates the roller 20. An emitter 16 and a receiver 18 are positioned on opposite sides of the grating 240. For example, the emitter 16 can be positioned on the PCB 15 between the supports 12a, 12b, and the receiver 18 can be positioned on the PCB 15 on the external-facing side of the support 12b. The emitter 16 emits light that is directed at the receiver 18, with the rotation of the roller 20 (and the grating 240) causing the light to be intermittently received by the receiver 18 via the alternating cut-outs of the grating 240. The emitter 16 and the receiver 18 form an encoding device that is well-known in the art, so that further discussion of the emitter 16, the receiver 18, and their operation, will not be necessary.

When a user is using the Z-axis device shown in FIGS. 1–3, the user will turn the roller 20 to scroll the contents on a display (such as a monitor connected to a computer). Since each of the slots of the grating 240 corresponds to one of the grooves 28 for purposes of outputting a position signal to the processor (not shown, but typically provided on the PCB 15) of the input device, the actual scrolling can be controlled to a great degree of accuracy. If the user presses the roller 20, the protrusion 32 of the axle sheath 30 will move downward to contact, and therefore activate, the micro switch 14, facilitating a further predetermined function, such as fast scrolling, log-on the Internet, etc.

Figure 4:
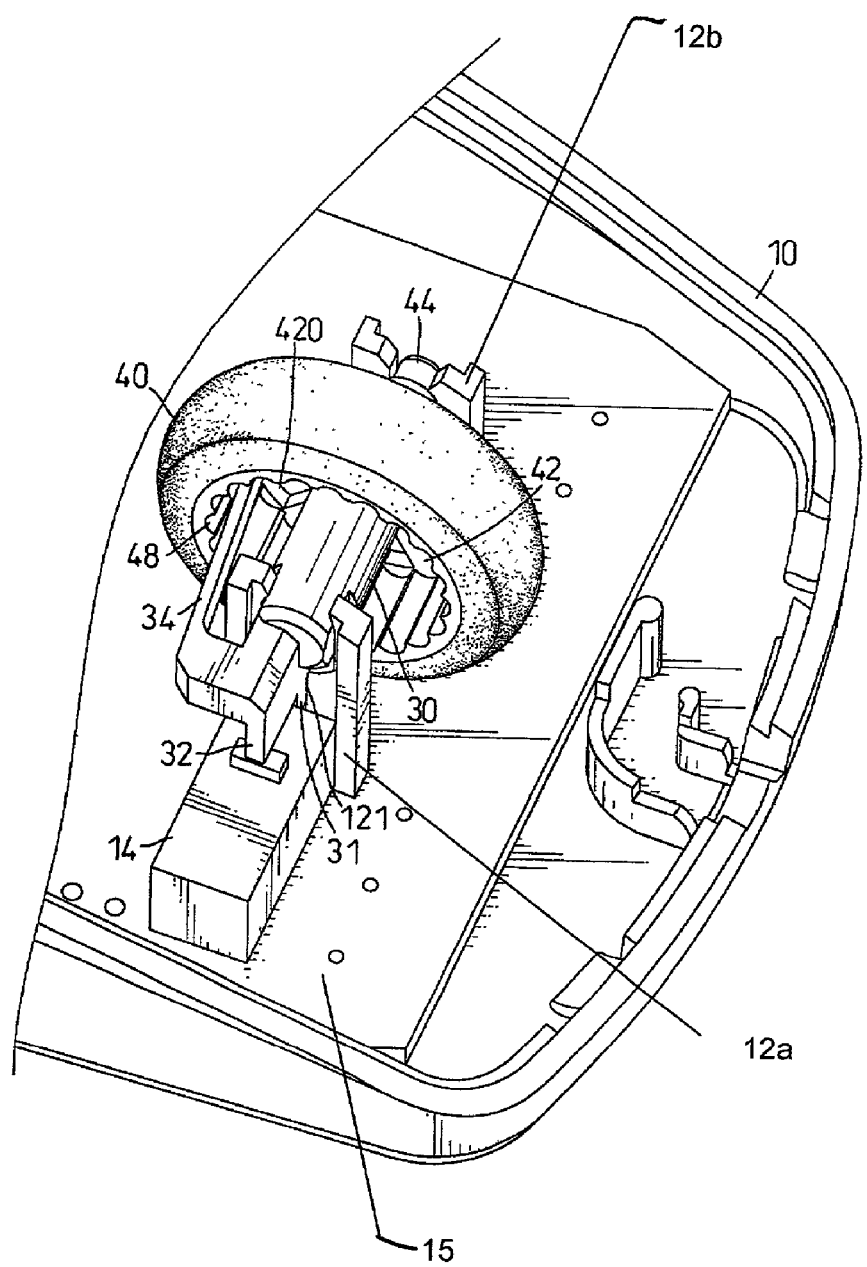
FIG. 4 is a perspective view of a Z-axis device within an input device according to another embodiment of the present invention.
Figure 5:
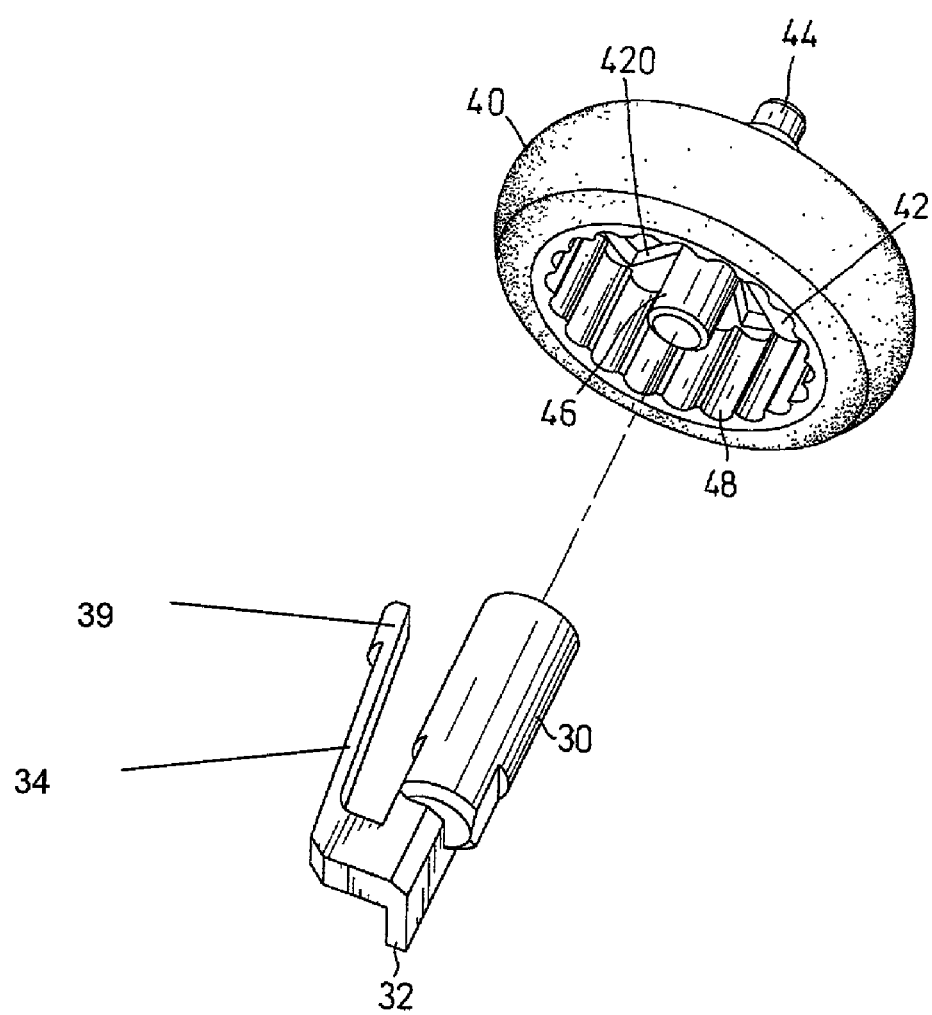
FIG. 5 is an exploded perspective view of the ratchet structure for the Z-axis device of FIG. 4.
Figure 6:
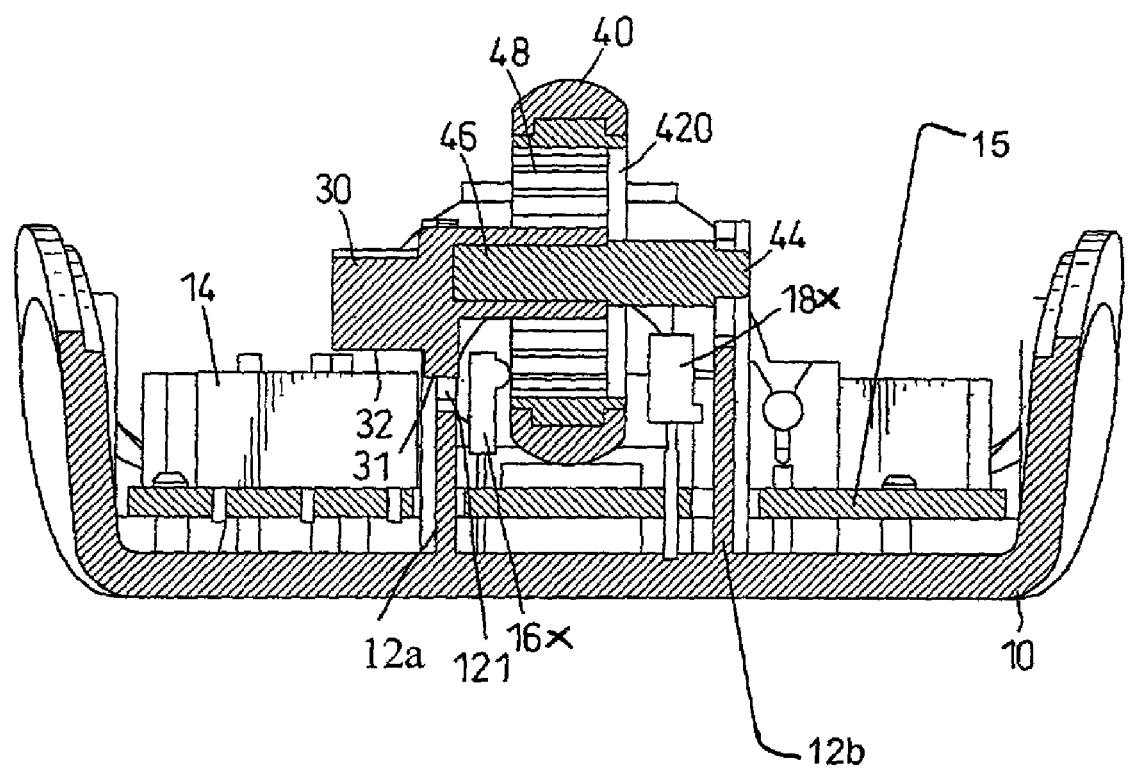
FIG. 6 is a cross-sectional view of the Z-axis device of FIG. 4.

FIGS. 4–6 illustrate another embodiment of a Z-axis device according to the present invention. The PCB 15, the axle sheath 30, the resilient element 34, the supports 12a, 12b, the groove 121, and the micro switch 14 are all identical to those in FIGS. 1–3, and so the same numerals will be used to designate these elements in FIGS. 1–3 and in FIGS. 4–6. In the embodiment of FIGS. 4–6, the roller 40 is slightly different from the roller 20 in FIGS. 1–3 in that the rim 42 is now combined with the grating 420. In other words, the cut-outs of the grating 420 are now provided as cutouts in the rim 42, so that the grating 420 and the rim 42 are actually the same element. The roller 40 is still supported on the support 12a by the axle sheath 30, and on the other support 12b by an outer axle 44. The outer axle 44 extends from a first side of the rim 42. The roller 40 has an inner axle 46 extending from a second side of the rim 42, and is inserted into the internal bore of the axle sheath 30 to couple the axle sheath 30 to the roller 40.

As shown in FIG. 6, the sheath 30 is sleeved onto the inner axle 46 and the roller 40 is positioned between the supports 12a, 12b, with the outer axle 44 pivoted on the support 12b and the axle sheath 30 pivoted on the support 12a. A fixing element 31 still extends from the bottom of the axle sheath 30 and lies in the groove 121, and functions to prevent the axle sheath 30 from rolling or rotating when the user rotates the roller 40.

As shown in FIG. 6, the emitter 16x and the receiver 18x are positioned differently from the emitter 16 and the receiver 18 in FIGS. 1–3. In particular, the emitter 16x and the receiver 18x are positioned between the pair of supports 12a, 12b, with the emitter 16x positioned on one side of the rim 42 (and grating 420) and the receiver 18x positioned on the other side of the rim 42 (and grating 420) so that the light from the emitter 16x can pass through the cut-outs in the grating 420 to be received intermittently by the receiver 18x. Positioning the emitter 16x and the receiver 18x between the pair of supports 12a, 12b further minimizes the space occupied by the Z-axis device within the input device.

Thus, the compact design of the axle sheath 30 and the roller 20 or 40 minimizes the space requirements for the Z-axis device of the present invention. The construction of the axle sheath 30 and the rollers 20 and 40 are also simple, thereby allowing the manufacturer to minimize the cost of making the input device.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A Z-axis device for an input device, comprising:
    a rotatable roller having a first side and a second side, the second side of the roller having a plurality of grooves provided along the second side;
    a first support and a second support spaced apart from the first support, the second support having a groove;
    a first axle extending from the first side of the roller and supported by the first support; and
    a second axle extending from the second side of the roller and being received in the groove of the second support in a manner that allows the second axle to reciprocate therein, the second axle having a sheath and a resilient arm extending from the sheath, the sheath having a fixing element that is retained in the groove, and which is configured, to prevent rotation of the sheath within the groove of the second support; and
    wherein the resilient arm constantly engages one of the grooves of the roller, and engages different grooves of the roller as the roller is rotated wherein the resilient arm damps the rotation of the roller so as to provide a rachet tactile feedback to a user.

2. The device of claim 1, wherein the sheath further includes means for activating a micro-switch when the roller is pressed.

3. The device of claim 1, wherein the resilient arm has an enlarged tip that engages one of the grooves of the roller.

4. The device of claim 1, wherein the roller drives an encoding device that includes:
    a grating provided on the roller, the grating having a plurality of cut-outs;
    an emitter provided on one side of the grating and emitting a light; and
    a receiver provided on another side of the grating and aligned with the emitter to receive the light emitted through the cut-outs.

5. The device of claim 1, wherein the roller experiences vertical reciprocating movement in the first and second supports.

6. The device of claim 1, wherein the sheath is non-rotatable with respect to the roller.

7. The device of claim 1, wherein the second side of the roller has an inner periphery, and the plurality of grooves is provided along the inner periphery.

8. A Z-axis device for an input device, comprising:
a rotatable roller having a first side and a second side, the second side of the roller having a plurality of grooves provided along the second side;
a first support and a second support spaced apart from the first support, the second support having a groove;
a first axle extending from the first side of the roller and pivotally connected to the first support in a manner which prevents upward and downward motion of the first axle at the location of its pivoting connection with the first support; and
a second axle extending from the second side of the roller and being received in the groove of the second support in a manner that allows the second axle to reciprocate therein, with the reciprocation of the second axle causing the first axle to only pivot about the first support, the second axle having a sheath and a resilient arm extending from the sheath, with the resilient element constantly engaging one of the grooves of the roller, and engaging different grooves of the roller as the roller is rotated wherein the resilient arm damps the rotation of the roller so as to provide a rachet tactile feedback to a user.

9. The device of claim 8, wherein the sheath further includes means for activating a micro-switch when the roller is pressed.

10. The device of claim 8, wherein the resilient arm has an enlarged tip that engages one of the grooves of the roller.

11. The device of claim 8, wherein the roller drives an encoding device that includes:
a grating provided on the roller, the grating having a plurality of cut-outs;
an emitter provided on one side of the grating and emitting a light; and
a receiver provided on another side of the grating and aligned with the emitter to receive the light emitted through the cut-outs.

12. The device of claim 8, wherein the sheath is non-rotatable with respect to the roller.

13. The device of claim 8, wherein the second side of the roller has an inner periphery, and the plurality of grooves is provided along the inner periphery.

14. The device of claim 8, wherein the sheath and the arm formed in the same piece.

15. The device of claim 1, wherein the sheath and the arm formed in the same piece.

* * * * *